United States Patent
Haberkern et al.

(10) Patent No.: US 10,860,007 B2
(45) Date of Patent: Dec. 8, 2020

(54) SMART RESOURCE MANAGER IN UNIFIED AUTOMATION PLATFORMS FOR ROBOTIC PROCESS AUTOMATION

(71) Applicant: Accenture Global Solutions Limited, Dublin (IE)

(72) Inventors: Albrecht Haberkern, Bremen (DE); Alan Sturtivant, Caerphilly (GB)

(73) Assignee: Accenture Global Solutions Limited, Dublin (IE)

( * ) Notice: Subject to any disclaimer, the term of this patent is extended or adjusted under 35 U.S.C. 154(b) by 281 days.

(21) Appl. No.: 16/037,144

(22) Filed: Jul. 17, 2018

(65) Prior Publication Data

US 2020/0026263 A1    Jan. 23, 2020

(51) Int. Cl.
G05B 19/418    (2006.01)
H04L 12/24    (2006.01)

(52) U.S. Cl.
CPC .... G05B 19/41865 (2013.01); H04L 41/5022 (2013.01)

(58) Field of Classification Search
CPC ........... G06Q 10/00–50/00; G05B 1/00–99/00
USPC .............................. 705/7.11–7.42
See application file for complete search history.

(56) References Cited

U.S. PATENT DOCUMENTS

| | | | | |
|---|---|---|---|---|
| 7,729,286 B2* | 6/2010 | Mishra | ................ | H04L 65/1096 370/254 |
| 7,996,842 B2* | 8/2011 | Savit | ....................... | G06F 9/505 718/104 |
| 8,199,670 B2* | 6/2012 | Mishra | .............. | H04L 29/06027 370/254 |
| 8,806,003 B2* | 8/2014 | Brown | .................... | H04L 41/00 709/224 |
| 9,336,059 B2* | 5/2016 | Brown | .................. | G06F 9/5072 |
| 9,448,824 B1* | 9/2016 | Fitzgerald | ........... | G06F 9/45533 |
| 9,465,663 B2* | 10/2016 | Mincarelli | ............ | G06F 9/5038 |

(Continued)

FOREIGN PATENT DOCUMENTS

| | | | | |
|---|---|---|---|---|
| WO | WO 2005/096138 | | 10/2005 | |
| WO | WO-2005096138 A2 * | | 10/2005 | ............. G06Q 10/06 |

OTHER PUBLICATIONS

Sommers, Joel, et al. "Multiobjective monitoring for SLA compliance." IEEE/ACM Transactions on Networking 18.2 (2009): 652-665. (Year: 2009).*

(Continued)

Primary Examiner — Alan S Miller
(74) Attorney, Agent, or Firm — Fish & Richardson P.C.

(57) ABSTRACT

Implementations directed to managing resources executing in one or more RPA platforms, and include actions of receiving process data representative of two or more processes executed by resources in a RPA platform, and resource data representative of the resources in the RPA platform, determining a process rank for each of the two or more processes, respectively, for at least one process, calculating a number of resources required to complete the process in conformance with a SLA governing the process, and transmitting instructions through a platform adapter to provision at least one additional resource to execute the process within the RPA platform, the platform adapter being specific to the RPA platform, and being one of a plurality of platform adapters.

17 Claims, 4 Drawing Sheets

(56) References Cited

U.S. PATENT DOCUMENTS

| | | | | |
|---|---|---|---|---|
| 2005/0256946 | A1* | 11/2005 | Childress | G06Q 10/06 709/223 |
| 2008/0304644 | A1* | 12/2008 | Mishra | H04L 29/06027 379/201.12 |
| 2009/0300632 | A1* | 12/2009 | Falcon | G06Q 10/00 718/103 |
| 2011/0093413 | A1* | 4/2011 | Calcaterra | G06F 11/3447 706/11 |
| 2011/0231525 | A1* | 9/2011 | Balani | G06F 9/5072 709/220 |
| 2011/0238552 | A1* | 9/2011 | Monogioudis | G06Q 40/04 705/37 |
| 2011/0307901 | A1* | 12/2011 | Blanding | G06F 9/5061 718/104 |
| 2012/0330711 | A1* | 12/2012 | Jain | G06Q 30/04 705/7.23 |
| 2017/0060627 | A1* | 3/2017 | Birkestrand | G06F 9/5088 |
| 2017/0352041 | A1* | 12/2017 | Ramamurthy | G06N 20/00 |

OTHER PUBLICATIONS

Sommers, Joel, et al. "Accurate and efficient SLA compliance monitoring." Proceedings of the 2007 conference on Applications, technologies, architectures, and protocols for computer communications. 2007. (Year: 2007).*

Yaqub, Edwin, et al. "Metaheuristics-based planning and optimization for sla-aware resource management in paas clouds." 2014 IEEE/ACM 7th International Conference on Utility and Cloud Computing. IEEE, 2014. (Year: 2014).*

Kertesz, Attila, Gabor Kecskemeti, and Ivona Brandic. "An SLA-based resource virtualization approach for on-demand service provision." Proceedings of the 3rd international workshop on Virtualization technologies in distributed computing. 2009. (Year: 2009).*

EP Search Report in European Application No. EP19186138, dated Jan. 27, 2020, 9 pages.

EP Search Report in European Application No. 19186138, dated Jul. 31, 2019, 7 pages.

* cited by examiner

SMART RESOURCE MANAGER IN UNIFIED AUTOMATION PLATFORMS FOR ROBOTIC PROCESS AUTOMATION

BACKGROUND

Robotic process automation (RPA) can be described as the use of software to perform high-volume, repeatable tasks on computer systems. More particularly, RPA includes computer software robots (bots) that are each configured to capture and interpret existing applications to, for example, process a transaction, manipulate data, trigger responses, and/or communicate with other systems. RPA is distinct from automation processes in that RPA is aware of, and can adapt to changing circumstances, exceptions, and new situations. Once an RPA bot has been trained to capture and interpret the actions of specific processes in existing software applications, the bot performs its assigned tasks autonomously. In some examples, RPA can expedite back-office and middle-office tasks in a wide range of industries, which can include, without limitation, manufacturing, health care, telecom, insurance, finance, procurement, supply chain management (SCM), accounting, customer relationship management (CRM), and human resource management (HRM).

Multiple providers provide RPA services through respective RPA platforms. As the number of individual RPA platforms, and the number of bots on respective RPA platforms increase, monitoring, controlling, and managing RPA systems become complex, resource-intensive tasks.

SUMMARY

Implementations of the present disclosure are generally directed to a unified automation platform (UAP) for robotic process automation (RPA). More particularly, implementations of the present disclosure are directed to a smart resource manager in UAPs for RPA.

In some implementations, actions include receiving process data representative of two or more processes executed by resources in a RPA platform, and resource data representative of the resources in the RPA platform, determining a process rank for each of the two or more processes, respectively, for at least one process, calculating a number of resources required to complete the process in conformance with a service level agreement (SLA) governing the process, and transmitting instructions through a platform adapter to provision at least one additional resource to execute the process within the RPA platform, the platform adapter being specific to the RPA platform, and being one of a plurality of platform adapters. Other implementations of this aspect include corresponding systems, apparatus, and computer programs, configured to perform the actions of the methods, encoded on computer storage devices.

These and other implementations can each optionally include one or more of the following features: actions further include determining that the at least one process is a highest ranking process based on a respective process rank, and in response, calculating the number of resources required; each process rank is determined based on a plurality of parameters associated with a respective process, the plurality of parameters including two or more of a relative priority of the process, a number of loaded, pending transactions for the particular process, a load time of a particular transaction, an SLA of the process, a time at which the calculation is performed, a current average time to complete a transaction, and a number of resources currently running the process; actions further include calculating, for a next ranking process, a number of resources required to complete the process in conformance with a SLA governing the next ranking process, and transmitting instructions through the platform adapter to provision at least one additional resource to execute the next ranking process within the RPA platform; a process rank for each of the two or more processes is iteratively determined during a period; actions further include executing at least one mitigation action in response to determining that a number of available resources is less than a number of resources required to complete the process in conformance with the SLA; and the instructions are transmitted by an autonomic platform (AP) of a unified automation platform (UAP) for RPA.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
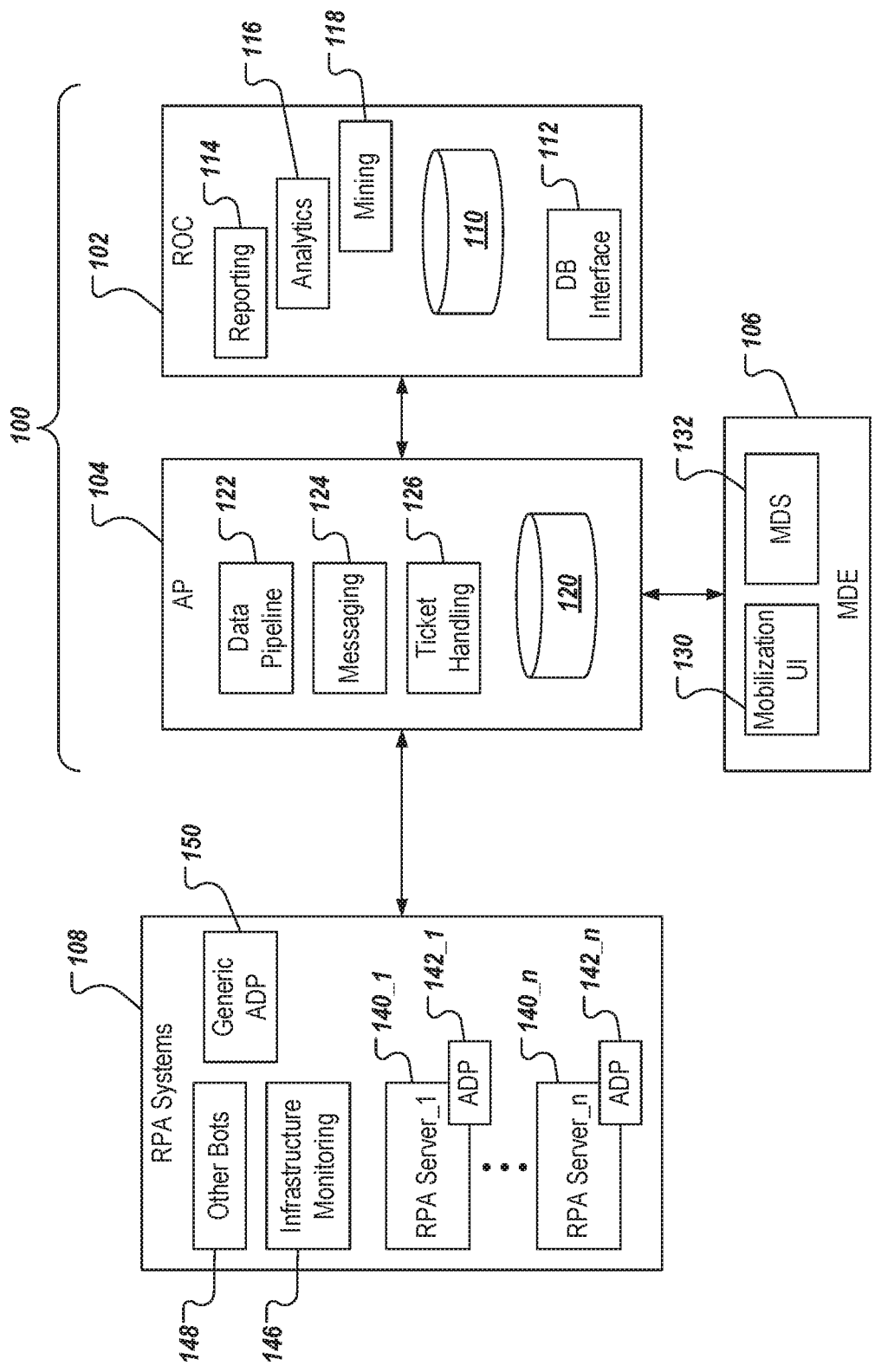
FIG. 1 depicts an example high-level architecture of an example unified automation platform (UAP) for robotic process automation (RPA).

Implementations of the present disclosure are generally directed to a unified automation platform (UAP) for robotic process automation (RPA). More particularly, implementations of the present disclosure are directed to a smart resource manager (SRM) in UAPs for RPA. In some implementations, actions include receiving process data representative of two or more processes executed by resources in a RPA platform, and resource data representative of the resources in the RPA platform, determining a process rank for each of the two or more processes, respectively, for at least one process, calculating a number of resources required to complete the process in conformance with a service level agreement (SLA) governing the process, and transmitting instructions through a platform adapter to provision at least one additional resource to execute the process within the RPA platform, the platform adapter being specific to the RPA platform, and being one of a plurality of platform adapters.

To provide further context for implementations of the present disclosure, RPA can be described as process automation technology that leverages software-implemented robots (also referred to herein as bots) to perform processes, or portions of processes. In some examples, bots include artificial intelligence (AI) features. Example AI features include, without limitation, intelligent scheduling, computer vision, language detection, entity recognition, and sentiment analysis. An RPA platform can be provided that includes multiple bots (e.g., tens, hundreds, thousands) executing on hardware systems. In some examples, a bot is deployed using a virtual machine (VM) that is executed on a hardware component (e.g., server). In some examples, multiple VMs, each running an instance of a bot, can be deployed on one or more servers.

In some examples, RPA can be implemented in organizations that have many different and complicated systems that need to interact together fluidly. For example, when an electronic form from a human resource system is lacking a form field, traditional automation software may flag the form as having an exception, and an employee would then handle the exception by, for example, looking up the missing information and entering it into the form. Once the form was completed, the employee might send it on to payroll so that the information could be entered into, for example, the organization's payroll system. With RPA, however, and continuing with the above example, a bot can be used, which is able to adapt, self-learn, and self-correct, handle exceptions, and interact with the payroll system without human assistance. Furthermore, technologies like presentation-layer automation software—a technology that mimics the steps of a rules-based, non-subjective process without compromising the existing information technology (IT) architecture—are able to consistently carry out prescribed functions, and scale-up or -down to meet demand.

RPA bots are provided in an RPA platform. Example RPA platforms include, without limitation, Automation Anywhere, Blue Prism, and UiPath. In some examples, an RPA platform provides a set of tools (e.g., bot development tools, bot management tools), libraries, and runtime environments for bots. In some examples, a bot can include one or more data objects, and logic that encodes a process (or portion of a process) that the bot is to perform. A bot interacts with one or more applications (i.e., computer-executable programs) to perform one or more jobs (e.g., processing a set of invoices). In some examples, each job includes one or more transactions (e.g., processing an invoice of the set of invoices), and each transaction can include one or more actions (e.g., entering invoice information into an application). For example, a data object of a bot can be connected to a user interface (UI) of an application (e.g., browser-based HTML interfaces, MS Windows interfaces, mainframe terminal interfaces, Java-based interfaces), and the data object executes one or more actions using the UI. For example, a data object can execute actions to log into an application, enter data, retrieve a result, and log off.

In some examples, a data object includes an application model, and one or more actions. For example, the application model is specific to an application that the bot is to interact with, and exposes elements of the UI of the application. The one or more actions include actions that the data object can perform with the application.

In some examples, an RPA platform can provide an application server that functions as a common control point for multiple bots, as well as a database. In some examples, the database functions as a shared repository for the RPA platform, storing code for each bot, work queues of the bots, audit logs, and the like. An RPA platform can also provide platform-specific control and monitoring tools for managing bots, creating dashboards, and the like.

Multiple RPA platforms can be provided across multiple enterprises. For example, a first RPA platform (e.g., Blue Prism) can be deployed for a first enterprise, and a second RPM platform (e.g., Automation Anywhere) can be deployed across a second enterprise. As noted above, however, each RPA platform includes platform-specific bots, monitoring, control, and databases. Consequently, each enterprise, and/or third-party operating on behalf of enterprises, is required to be knowledgeable about respective RPA platforms, and implement RPA platform-specific processes, and procedures to effectively, and efficiently manage and control bots on the respective RPA platforms.

In accordance with implementations of the present disclosure, a UAP is provided, which enables control, and monitoring, among other functionality, across multiple, disparate RPA platforms. In this manner, the UAP provides a central platform for management, control, analytics, and the like across multiple RPA platforms, and across multiple enterprises. For example, the UAP can be hosted, or operated by a third-party that performs RPA monitoring and control services for multiple enterprises across multiple, disparate RPA platforms. In some implementations, and as described in further detail herein, the UAP includes an RPA operations center (ROC), and an AP. In general, the UAP provides cross-platform monitoring and control at multiple levels. Example levels include a process level, a bot level, and an RPA platform level. The UAP provides, among other functionalities, reporting and analytics to measure and improve RPA services, and increase RPA levels, as well as control RPA platforms, and individual bots. Accordingly, the UAP of the present disclosure can operate across hundreds, or thousands of bots across multiple RPA platforms.

FIG. 1 depicts an example UAP 100 in accordance with implementations of the present disclosure. The example UAP 100 includes an ROC 102, and an AP 104. In the depicted example, the UAP 100 also includes a master data entry (MDE) platform 106. In accordance with implementations of the present disclosure, the UAP 100 interfaces with one or more RPA systems 108 to provide bot monitoring and control, among other functionality, across multiple, disparate RPA platforms, and multiple, disparate enterprises. In some implementations, the UAP 100 communicates with the RPA systems over one or more networks. In some examples, a network can include a large computer network, such as a local area network (LAN), a wide area network (WAN), the Internet, a cellular network, a telephone network (e.g., PSTN), or any appropriate combination thereof connecting any number of communication devices, mobile computing devices, fixed computing devices, and back-end systems.

In some implementations, and as described in further detail herein, the AP 104 provides real-time monitoring, and bot control. As used herein, real-time may describe an operation that is performed without any intentional delay, taking into account the processing, and/or communication limitations of the computing system(s) performing the operation and the time needed to initiate, and/or perform the operation. Real-time may be used to describe operations that are automatically executed in response to a triggering event, for example, without requiring human input. In some examples, the AP 104 receives data from the RPA systems 108, and processes the data to provide, among other things, alerts and events. In some implementations, and as described in further detail herein, the AP 104 includes interface components (not shown) that provide logic for real-time monitoring and control of bots of the RPA systems 108 (e.g., logic to trigger alerts to support teams).

In some implementations, the ROC 102 provides ex-post reporting, analytics, and visualizations. In some examples, the ROC 102 receives data, alerts, events, and the like from the AP 104, and provides data reporting, and analytics across the multiple RPA platforms. For example, the ROC 102 provides UIs (e.g., dashboards) that enables users to view visualizations representing performance of RPA platforms, processes, individual bots, and/or groups of bots, across one or more enterprises, for which the RPA platforms are deployed. In some implementations, the UAP 100 enables users to take remedial measures, for example, in the event that performance is degraded. For example, the user can interact with the UAP 100 to adjust bot schedules, and/or spin-up, or spin-down bots to address workload fluctuations.

In the depicted example, the ROC 102 includes a database 110, a database (DB) interface 112, a reporting module 114, an analytics module 116, and a data mining module 118. In the depicted example, the AP 104 includes a database 120, a data pipeline module 122, messaging components 124, and a ticket handling module 126. In the depicted example, the MDE 106 includes a mobilization UI 130, and one or more master data systems (MDSs) 132.

In the examples of FIG. 1, the RPA systems 108 represents multiple RPA platforms, and/or other bot frameworks that are to be monitored, and/or controlled by the UAP 100. In the depicted examples, the RPA systems 108 includes multiple RPA servers 140_1, 140_n, each RPA server corresponding to a respective RPA platform (e.g., RPA server 140_1 is a Blue Prism RPA server; RPA server 140_n is an Automation Anywhere server). Each RPA server 140_1, 140_n is associated with a respective adapter (ADP) 142_1, 142_n. The RPA systems 108 further include infrastructure monitoring components 146, one or more other bots 148, and a generic ADP 150.

In accordance with implementations of the present disclosure, the AP 104 communicates with the respective RPA servers 140_1, 140_n through the data pipeline module 122. More particularly, and as described in further detail herein, the data pipeline module 122 ingests data from the respective RPA servers 140_1, 140_n through the respective adapters 142_1, 142_n. In some implementations, each adapter 142_1, 142_n is specific to a respective RPA platform, but is provided using a design pattern, and standardized module across adapters 142_1, 142_n. The adapters 142_1, 142_n enable communication between the UAP 100, and the respective RPA platforms, manage retrieval of data (e.g., status information) from respective RPA databases, and enable discovery, and control of bots in the respective RPA platforms. Each adapter 142_1, 142_n pulls data from the respective RPA platforms 140_1, 140_n In some implementations, the RPA systems 108 include one or more application program interfaces (APIs) that support communication with the UAP 100. In some examples, a push-listener API (not shown) is provided, and enables listening for incoming data that is pushed from one or more bots. In some examples, the push-listener API receives data from bots that are registered with the UAP 100 through the MDE 106. Although the push-listener API may receive data from non-registered bots, an error message is triggered. In effect, the push-listener API is a corollary to an adapter (e.g., the adapters 142_1, 142_n) for any automation tools, and/or bots that are not tied to a particular RPA platform (e.g., do not have a central automation application database), or where retrieval of monitoring data from such a central database is not possible. Accordingly, the monitoring data is pushed from individual automations to the push-listener API, as opposed to being pulled (as is the case with the adapters 142_1, 142_n).

In some implementations, the generic adapter 150 enables controlling (e.g., starting, stopping) of bots in RPA platforms, for which no platform-specific adapter (e.g., the adapters 142_1, 142_n) exists. In general, such bots can be controlled through a command line interface (CLI). The generic adapter 150 calls generic programs, and waits for return code. Parties providing such bots implement batch, and executable programs that are to be called by the generic adapter 150, and provide configuration files, and addresses (e.g., uniform resource locators (URLs)) to the batch, and executable programs.

In some implementations, an infrastructure API (not shown) is provided. The infrastructure API can include a web service interface for communicating infrastructure monitoring data. In some examples, the infrastructure API specifies generic data inputs, which infrastructures provide, and/or tools can provide. In some implementations, an infrastructure adapter (not shown) is provided, and can include a set of scripts (e.g., Powershell scripts) that communicate with the infrastructure API to monitor infrastructure, for which no other monitoring tool is available. In this manner, the infrastructure adapter provides a generic infrastructure monitoring solution.

In some implementations, the MDE 106 enables registration of bots that are not auto-discovered through adapters (e.g., the adapters 142_1, 142_n), or which are not registered directly to the UAP 100 (e.g., by an agent of a provider of the UAP 100). In some examples, the mobilization UI 130 is a web portal, through which a bot owner/operator can register a bot with the UAP 100. Such owner/operators can include, for example, any person or entity wanting to leverage the functionality provided by the UAP 100. In some implementations, the mobilization UI 130 validates data that is received against so-called golden source systems, and ensures completeness of master data of respective bots. In some examples, the mobilization UI 130 automates onboarding of non-discoverable bots, ensures data quality, and avoids non-matching data issues. In some examples, the MDS 132 represents any other third-party components (e.g., applications, data stores, services that are not part of the UAP 100), which are used to validate master data as part of bot onboarding to the UAP 100.

With particular reference to the AP 104, the database 120 is provided as a central database for storing data records received from the RPA systems 108. In some examples, the database 120 is provided as an online transaction processing (OLTP) database provided on a SQL server. In some implementations, the data pipeline 122 can include a central messaging system that is used to communicate data between components of the UAP 100. In some examples, the data pipeline 122 can be provided as a messaging system for communicating voluminous data. In some examples, the data pipeline 122 is provided using Kafka, which is provided by the Apache Software Foundation. Kafka can be described as a distributed streaming platform that enables messaging (e.g., queuing, publish-subscribe) for streaming data records, as well as real-time processing of the data records. In some examples, the data pipeline 122 is provided as a cluster (Kafka cluster) on one or more servers, and stores streams of data records, each data record. A data record can include a key, a value, and a timestamp. In some examples, the data pipeline 122 receives data records from producers. Example producers can include RPA platforms, and bots. In short, the producers produce data records, which are received by the data pipeline 122.

In some implementations, the messaging components 124 represent one or more channels, through which messages can be provided (e.g., to users, to computing systems). Example channels include, without limitation, electronic messages (e-mail), instant messages, text messages, and SMS messages. For example, logic executed by the AP 104 can trigger an alert (e.g., bot failure), and a message can be sent over one or more of the messaging components 124 in response thereto (e.g., to a user responsible for monitoring bot activity).

In some implementations, the ticket handling module 126 provides a ticket generation and management system that is used to track resolution of incidents. In some examples, the ticket handling module 126 is provided by a third-party service provider, and is external to the UAP 100. An example ticketing system can be provided by Service Now. In such examples, the AP 104 communicates with the external ticketing system through a respective API.

With regard to the ROC 102, data is ingested into the database 110 through the database interface 112. In some implementations, the database 110 is provided as an online analytical processing (OLAP) database. In general, the database 110 functions as a central database for analytics, reporting, and visualizations. In some examples, the database interface 112 is provided as a database link with OLTP, and/or extraction, transforming, and loading (ETL) (e.g., using SQL Server Integration Services (SSIS)). In some examples, the database interface 112 receives data from the database 120 of the AP 104, transforms data (e.g., from an OLTP data schema to an OLAP data schema), and performs data aggregation (e.g., for reporting). In some examples, the database interface 112 receives data from one or more other systems, such as the ticket generation and management system introduced above.

In some implementations, the reporting module 114 queries data from the database 110, and provides reports (e.g., textual, graphical). In some examples, the reporting module 114 provides reports through one or more dashboards, and/or transmits reports to external computing devices (e.g., emails reports to users). In some implementations, the ROC 102 includes a reporting API (not shown). In some examples, the reporting API exposes a web service that enables data sets to be accessed (e.g., for consumption by client reporting systems, data mining systems, AI systems, bespoke reporting systems, analytics systems).

In some implementations, the analytics module 116 provides reporting and dashboard visualizations for RPA support teams (e.g., agents of the UAP responsible for supporting RPA execution). In some examples, the analytics module provides access to standardized reports and dashboards that provide actionable information to improve RPA execution, and provide service status, and bot health information. In some implementations, the data mining module 118 provides more advanced dashboards and data visualizations, and can leverage third-party services. An example third-party service can include Tableau provided by Tableau Software. In some examples, the ROC 102 includes one or more other data mining technologies.

As introduced above, implementations of the present disclosure are directed to resource management in UAPs for RPA. In particular, implementations of the present disclosure are directed to scheduling of process runs in RPA platforms, and provide a SRM, which can also be referred to as a self-managing resource service. In some implementations, the SRM is at least partially provided by an AP, such as the AP 104 of FIG. 1, and described in further detail herein. In accordance with implementations of the present disclosure, the SRM monitors resource utilization across RPA platforms, and re-/allocates resources (e.g. bots) in order to achieve compliance with client service level agreements (SLAs). In some examples, a client is an enterprise, on behalf of which RPA is being performed. As described in further detail herein, the SRM performs calculations on actively running processes in order to rank processes to provide a ranking that reflects a risk of potentially missing configured SLAs. Resources can be re-/allocated in an effort to mitigate missing SLAs.

Figure 2:
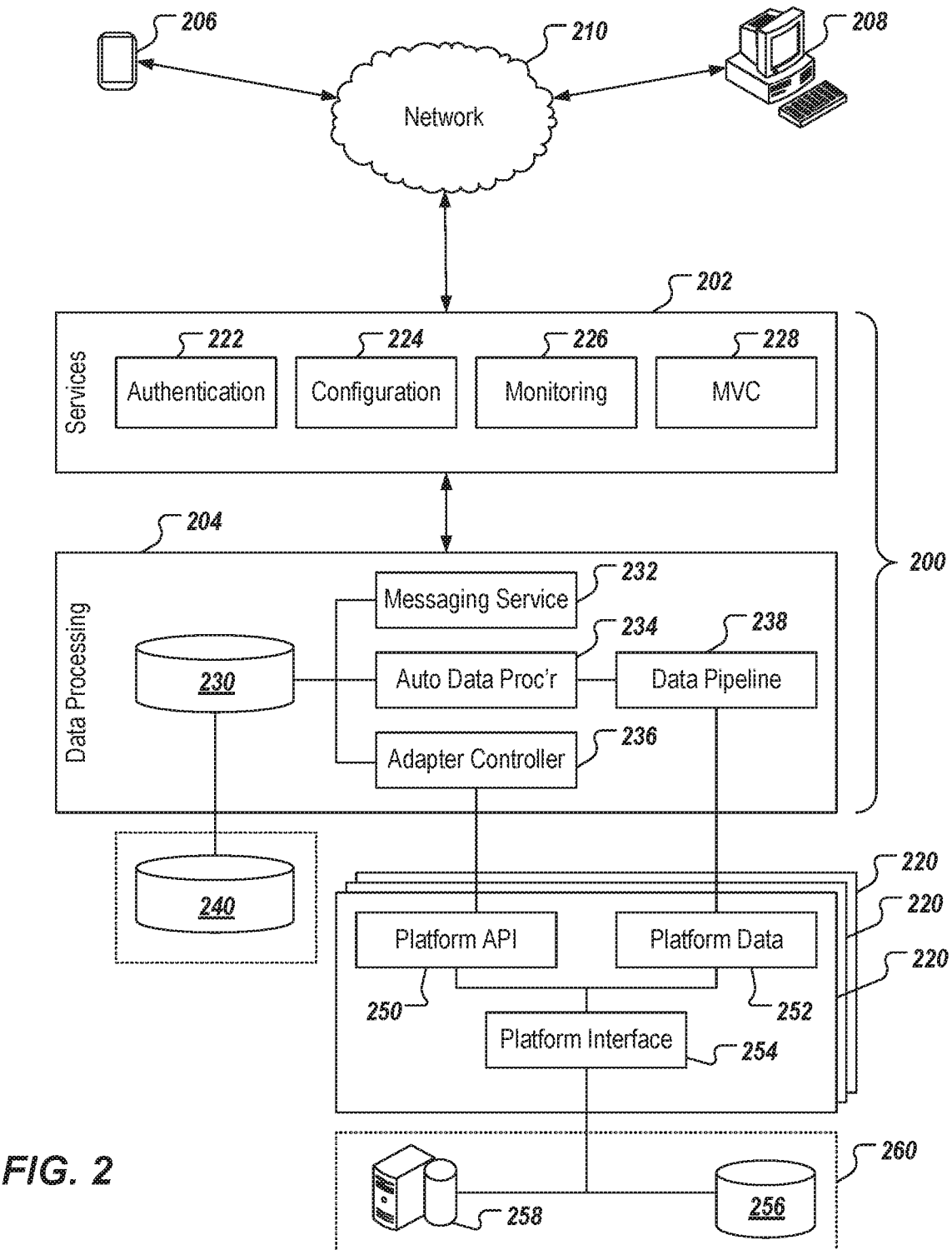
FIG. 2 depicts an example high-level architecture of an example autonomic platform (AP) of the UAP of FIG. 1.

FIG. 2 depicts an example high-level architecture of an example AP 200 of a UAP. For example, the AP 200 of FIG. 2 can be an example implementation of the AP 104 of the UAP 100 of FIG. 1. In the depicted example, the AP 200 includes a services layer 202, and a data processing layer 204. In some examples, one or more computing devices 206, 208 can communicate with the AP 200 over a network 210. One or more platform adapters 220 are provided, through which the AP 200 communicates with respective RPA platforms (e.g., Blue Prism, Automation Anywhere, UiPath). In some examples, each adapter 220 is authenticated to its respective RPA platform. For example, an adapter 220 includes an authentication token, which is generated during an installation and authentication process of the adapter 220 on the respective RPA platform.

In general, the AP 200 provides detailed status information regarding each process, and/or resource of respective RPA platforms. Example status information includes, without limitation: how many resources are running a process and will be required to complete the assigned tasks (e.g., within a SLA target); how many cases are pending to start, loaded new, and carried over from a previous time period (e.g., day); and expected completion time, average case time, and oldest case date. In some examples, a case is a segment of work to be completed by a process. For example, a case can include processing a series of invoices for payment, a task within the case can include processing a single invoice. The AP 200 also enables control of resources, for example: start and stop resources; restart the automation service the resource is running on, reboot the resource; a fail-safe prompt to reduce the chance of human error; live information about the resource (e.g., status, last case time, and log history); list available resources against all or selected processes with group selection; and providing a calendar for viewing history of processing tasks and logs.

In further detail, the services layer 202 includes a plurality of services, through which users can interact with the AP 200. In some examples, each service is provided as a web service. Example services include, without limitation, an authentication service 222, a configuration service 224, a monitoring service 226, and a control service 228.

In some examples, the authentication service 222 authenticates users for access to the AP 200. In some examples, authentication is at least partially conducted through the network 210 (e.g., the computing device 206, 208 connecting through a virtual private network (VPN)). In some examples, users are explicitly added to the AP through a control panel of the authentication service 222. All user sessions and operations are logged in a database of the AP 200, described herein. In one example, the authentication service 222 expects valid credentials (e.g., username, password), and returns an access token that is used in subsequent calls (e.g., when authenticating with a REST API, the AP 200 uses a standard OAuth2 Bearer workflow). In some examples, the authentication service 222 is also responsible for answering queries about user permissions to system resources, as well as allowing administrators to modify the access levels of other users.

In some examples, the configuration service 224 enables configuration of the AP 200. Example configurations can include, without limitation, creating/managing user profiles, setting up communication with RPA platforms, defining polling rates (e.g., frequency of polling RPA platforms for data), and the like. In some examples, the monitoring service 226 enables configuration of monitoring activities, and visualizations to be displayed. For example, the monitoring service 226 can be used to identify processes, bots, groups of bots, and/or RPA platforms that are to be monitored, as well as types of visualizations to be displayed for each. In some examples, the configuration service 224 enables querying, adding, and/or modifying domain-specific configurations in the AP 200. Example domain-specific configurations include, without limitation, client information, process information, and resource assignments.

In some implementations, the control service 228 accepts command requests for processes and resources, and stores the requests for background execution. In some examples, the control service 228 is provided as a model-view-controller (MVC) service.

In the depicted example, the data processing layer 204 includes a database 230, a messaging service 232, an automation data processor 234, an adapter controller 236, and a data pipeline 238. In some examples, the database 230, the messaging service 232, and the data pipeline 238 respectively correspond to the database 120, the messaging components 124, and the data pipeline 122 of FIG. 1. In some examples, the automation data processor 234 processes data about the state of the RPA platforms 260, and ensures that the database 230 reflects information correctly. The automation data processor 234 also calculates red-amber-green (RAG) statuses of the processes and resources that are monitored.

In some implementations, multiple automation data processors 234 are provided, and process data records having respective record types. Example record types are described in further detail herein. For example, a first automation data processor 234 is provided, which processes data records of a first type, and a second automation data processor is provided, which processes data records of a second type. In some examples, and as also described in further detail herein, the data pipeline 238 receives messages with data records from the adapters 220. The data pipeline 238 places the messages in respective processor queues. For example, messages having data records of the first type are placed in a first processor queue, and messages having data records of the second type are placed in a second processor queue. The automation data processor 234 retrieves messages from its respective queues, and processes the data records as described herein (e.g., determining RAG status, inserting into the database 230).

In some implementations, the data processing layer 204 periodically receives data from each RPA platform through respective adapters 220. In some implementations, each adapter 220 is specific to a respective RPA platform, and is installed on an RPA server of the RPA platform. For example, the adapters 220 of FIG. 2 correspond to the adapters 142_1, 142_n of FIG. 1. In some examples, the adapter 220 harmonizes data by transforming data of the respective RPA platform into a data schema used by the AP 200, and providing the data to the AP 200 (e.g., to the data pipeline 238). In some examples, each adapter 220 includes multiple modular libraries, and code packages. One or more libraries are specific to the respective RPA platform that the adapter 220 is installed on. One or more libraries are common to all of the adapters 220, regardless of which RPA platform.

In the depicted example, an adapter 220 includes a platform API 250, a platform data module 252, and a platform interface 254. In some examples, the platform interface 254 communicates with hardware 258 (e.g., servers, on which bots run), and/or a database 256 (e.g., storing log tables) of the respective RPA platform 260. For example, the platform interface 254 requests, and receives data from the database 256, which data is provided to the data pipeline 238 through the platform data module 252. In some implementations, the adapter controller 236 provides control signals for controlling a process, and/or bot through the platform API 250. For example, a process, and/or bot can be started, or stopped. In some examples, the adapter controller 236 can be used to configure, among other things, credentials for accessing the respective RPA platform 260, setting exception parameters (e.g., to trigger an exception), and the like.

In some implementations, the platform data module 252 relays data records (e.g., containing automation information) from the RPA platform 260 to the AP 200. Token and SSL authentication is in place to ensure the data is securely sent. In some examples, the platform data module 252 includes an automatic discovery that synchronizes new processes, and/or resources to ensure the AP 200 reflects the current state of the RAP platform 260. In some examples, automation synchronization transfers process run, resource run, and truncation status information. In some examples, the platform data module 252 publishes messages from a messaging queue to an AutomationData topic hosted on the data pipeline 238. In some implementations, the platform API 250 receives authenticated calls (e.g., REST calls) from the AP 200 to trigger resource action, and/or process action, and/or remote updates of configuration.

As introduced above, the data pipeline 238 can be provided as a Kafka cluster. In some examples, there are three main types of objects in the data pipeline 238: topics (queues of messages), producers (actors that add messages to a topic), and consumers (actors that take messages out of a topic). In the present context, the automation data processor 234 is a consumer, and the platform data module 252 is a producer. In some examples, the data pipeline 238 ensures that consumers of a topic receive its messages in the order they were added. In the present context, the platform data module 252 produces messages for the AutomationData topic. In some examples, the data in the messages includes, without limitation: newly discovered processes, and/or resources in the RPA platform 260; newly created instances of a process, and/or a resource are created; and transaction status, and log data for running processes, and/or running resources.

In some implementations, parameters can be defined to determine whether a respective process, bot, and/or RPA platform is operating as expected (e.g., meeting service level agreements (SLAs)), and/or whether there are any problems (e.g., process unexpectedly stopped, bot performance is degraded, hardware performance is degraded). In some examples, if operation is not executing as expected, and/or there is a problem, an exception is triggered. Example exceptions can include a process, a bot, and/or a RPA platform not meeting a required SLA (e.g., a business exception), and performance degradation of a process, a bot, and/or a RPA platform (e.g., a technical exception). In response to an exception, reports, and/or alerts can be provided.

In general, the AP 200 ingests data from one or more RPA platforms through the data pipeline 238, processes the data using the automation data processor 234, and stores the data in the database 230. In the depicted example, a back-up database 240 is provided, which can store redundant copies of the data, and any reports or the like that the AP 200 provides. In some examples, the messaging service 232 transmits notifications (e.g., alerts), for example, in response to conditions (e.g., an e-mail to a user responsible for monitoring the particular RPA platform). In some examples, the reports, and/or alerts are graphically represented using one or more visualizations (e.g., provided through the monitoring service 226). Example notifications can include, without limitation: process X has completed, resource X has completed, process X has a high application exception rate; process X has a high business exception rate; resource X has stopped responding; and resource X has not responded in X minutes.

In some implementations, the data is provided in various data types. Example data types include, without limitation, process run, resource run, transaction, log. In some examples, process data is representative of a particular process executed by a bot (e.g., a process that queues tasks to be performed). In some implementations, data is provided to the AP 200 in one or more data records. For example, a data record having a process type can include the example tuple, process identifier, process information (e.g., status, bot identifier), timestamp, process run type. In some examples, resource data is representative of a bot performing tasks. For example, a data record having a resource type can include the example tuple: resource identifier, resource information (e.g., status, process identifier), timestamp, resource run type. In some examples, transaction data is representative of actions (e.g., a task changing from a pending status to a running status on a particular bot). For example, a data record having a transaction type can include the example tuple: transaction identifier, transaction status (e.g., pending, running, process identifier, bot identifier), timestamp, transaction type. In some examples, log data is representative of data added to one or more logs (e.g., an exceptions log). For example, a data record having a log type can include the example tuple: log identifier, log data (e.g., application/bot/process failed), timestamp, log type.

In some implementations, each data record is tagged. Example tags can include, without limitation, create, update, and delete. A create tag can indicate that a log entry is to be created, that a process has started, or that a resource has started. An update tag can indicate that data associated with a process or a resource has changed. A delete tag can indicate that a process or a resource has finished.

In accordance with implementations of the present disclosure process runs in RPA platforms, are schedule. Upon execution of the process runs, the SRM that monitors resource utilization across RPA platforms, and re—/allocates resources (e.g. bots) in order to achieve compliance with client SLAs.

In some implementations, a scheduler service is provided, which provides events for each client based on a periodic schedule. In some examples, the scheduler service is executed on the AP (e.g., the data processing layer 204 of the AP 200 of FIG. 2). In some implementations, a period is provided as a day, which is referenced herein for purposes of illustration. It is contemplated, however, that implementations of the present disclosure can be realized using any appropriate period (e.g., day(s), week(s), month(s), year(s)). In some examples, a schedule is provided for each client, which includes events that are scheduled for the client over the period. In some implementations, the scheduling service determines whether a schedule is already provided for a client for a given period. If a schedule is not already provided, a schedule is generated.

Figure 3:
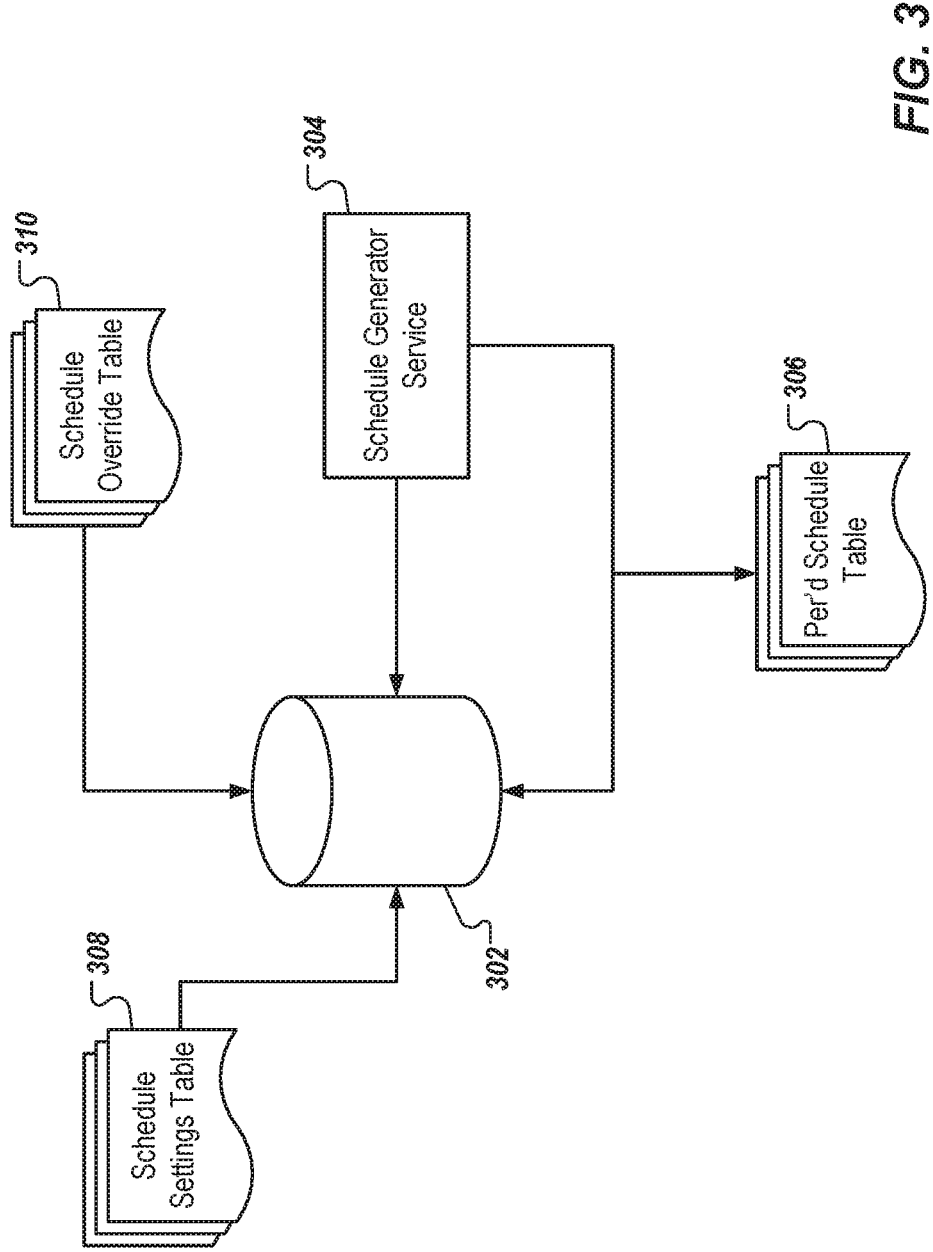
FIG. 3 depicts a conceptual architecture for providing a schedule in accordance with implementations of the present disclosure.

FIG. 3 depicts a conceptual architecture 300 for providing a schedule in accordance with implementations of the present disclosure. In the example of FIG. 3, a database 302, and a schedule generator service 304 are provided. In some examples, the database 302 is provided as the database 230 of FIG. 2. In some implementations, the schedule generator service 304 provides a schedule 306 (provided as a period schedule table) based on a schedule settings table 308, and schedule override table 310. In some examples, the scheduler service only schedules events that are provided in the period schedule table 306.

In further detail, and in some implementations, the schedule settings table 308 records high-level settings for scheduling processes for a particular client. In some examples, the schedule settings table 308 records raw time settings (e.g., hours, days of week) without the actual calculated data in terms of exact dates and times. For example, a first scheduling table can be provided for a first client, which records hours of operation as 9 AM-5 PM on Mondays through Fridays, and a second scheduling table can be provided for a second client, which records hours of operation as 10 PM-4 AM on Mondays through Thursdays. In some examples, the hours of operation indicate times, during which RPA can be performed for the respective client. In some examples, a scheduling settings table 308 is provided for a particular client, and a particular process, and indicates, for example, the hours of operation that the particular process can be performed for the particular client. Example fields of the schedule settings table 308 can include, without limitation, ScheduleSettingID (unique identifier assigned to the table), ClientID (unique identifier assigned to the particular client), ProcessID (unique identifier assigned to the process), StartDate (earliest day process can be started), EndDate (last day process is to end by), StartTime (earliest time process can be started), EndTime (time process is to finish by), and Time (duration of process). It is contemplated that not all fields need contain values for a schedule to be generated based on the schedule settings table 308 (e.g., Time can be empty, and the respective process can still be scheduled).

In some implementations, the schedule override table 310 is used to resolve scheduling conflicts with the schedule settings table 308. For example, the schedule settings table 308 can indicate that a particular process for a particular process is to be executed on a Monday. However, it can be determined that an upcoming Monday is a holiday, during which processes are not to be executed for the particular client (or at least the particular process is not to be executed). Consequently, an override can occur, which reschedules the process for another date, and/or time. Continuing with the example above, the process can be scheduled to occur on the Friday preceding the holiday Monday.

In some implementations, for each client, a client working hours table (not shown) is provided. The client working hours tables defines the working hours, during which processes can be executed by the RPA platform(s). Example fields of the client working hours table can include, without limitation, a ClientID (uniquely identifying the client), ServiceDayOfTheWeek (indicating days of the week, during which processes can be executed), StartTime (earliest time process can be started), EndTime (time process is to finish by), and Time (duration of process).

In some implementations, a calendar table (not shown) is provided, which provides calendar details for a given location (e.g., city, state, province, country), and time zone. In some examples, the calendar table is used to translate days of the week, and/or times to actual calendar dates, and times. In some examples, operating hours for a client can be translated to actual dates/times for the client's location. For example, for a given week, 9 AM-5PM on Mondays through Fridays can be translated to 9 AM Central US-5PM central US on Jun. 4, 2018 (Monday), Jun. 5, 2018 (Tuesday), Jun. 6, 2018 (Wednesday), Jun. 7, 2018 (Thursday), Jun. 8, 2018 (Friday).

In some implementations, a holiday table is provided, which records holidays for particular locations (e.g., city, state, province, country). Accordingly, for a given client, and a given location, operating hours can be compared to holidays to determine whether a conflict is present, and an override is to me implemented. For example, operating hours for a client located in Germany can include 9 AM-5PM on Monday. The calendar table, described above, can be used to determine that an upcoming Monday, for which one or more processes are to be scheduled for the client is Mar. 4, 2019. The holiday table can be used to determine that Monday, Mar. 4, 2019 is a national holiday in Germany. Consequently, a conflict exists, which can be resolved using an override (e.g., the process is executed on a date before/after Monday, Mar. 4, 2019).

In accordance with implementations of the present disclosure, the period schedule table 306 (e.g., daily schedule table), all scheduled occurrences for a period (e.g., day) for each RPA platform. For example, the period schedule table 306 records all scheduled execution times for each process that is to be run on the current calendar day. Example fields of the period schedule table 306 include, without limitation, a ScheduleEntryID (uniquely identifying the process execution), ExecutionTime (the date/time of execution), Ran (indicator as to whether the process ran and was completed), and IsActive (indicator as to whether the process is currently executing).

In some implementations, one or more services are leveraged by the schedule generator service 304 to provide schedules for respective clients, and processes. In some examples, a list of all schedules that are stored for a particular client is provided. For example, the list of schedules is taken from the schedule table, and the settings fields are populated from the schedule settings table of the client. A conflict flag can be populated, if there is an entry in the schedule override table. In some examples, a schedule can be deactivated by marking the schedule inactive based on its unique schedule identifier. Similarly, and in some examples, a schedule can be activated by marking the schedule active based on its unique schedule identifier.

In some implementations, an event processor periodically checks for new events generated by the scheduler service, and also picks up any manual force-starts of schedules. In some examples, the event processor provides a set of commands (instructions), which are sent to one or more RPA platforms (e.g., through respective platform adapters) to manage resources (e.g., execution of process by bots). In some implementations, an event processor processes resource data to identify available resources, and to monitor resources executing processes. In some examples, the event processor sends the appropriate start command to the assigned available resources (e.g., send the identifier of the process to be executed to a designated resource, and create a process run entry with scheduled status). In some examples, a process run identifier is sent to an adapter service of the AP, and the actual running and execution of the process run can be monitored and correlated from the AP's perspective.

In accordance with implementations of the present disclosure, a SRM is provided, which re-/allocates RPA platform resources (e.g., bots) based on schedules provided for process execution. More particularly, the SRM2 actively monitors resource utilisation, and reallocates resources in order to achieve compliance with client SLAs. In some implementations, and as described in further detail herein, the SRM performs calculations on actively running processes in order to rank the process, and determine a risk of potentially missing a configured SLA. As described in further detail herein, the SRM can operate based on a type of SLA for a given client. Example types of SLAs include, without limitation, a dynamic SLA, and a fixed SLA.

With regard to dynamic SLAs, each transaction of a process automation (e.g., bot-performed process) is to be completed by a certain delta time from the transaction being loaded. Accordingly, a dynamic SLA strives to include a metric of how long each transaction has until it reaches a deadline stated in a corresponding SLA configuration. In some instances, missed SLAs are penalized with negative contributions towards the total sum time of the process execution, and drive down an average "closeness" to a process execution deadline. Closeness to, or passing of the deadline can be evaluated based on the time expected to complete all transactions at the current resource rate. This provides an overall number representative of a relative urgency to allocate more resources to process(es). In accordance with implementations of the present disclosure, the SRM can rank resources based on the following example relationship:

$$P_{rank} = \frac{R_{input}}{\frac{\sum_{tnx=1}^{N_{tnx}}(L_{tnx} + SLA_d - now)}{N_{tnx}}} - \left(\frac{A * N_{tnx}}{R}\right)$$

where $P_{rank}$ is a rank value determined for a resource (bot), $R_{input}$ is a rank value indicating a relative priority of the process (e.g., in a range of 1 to int32, with 1 being a highest rank value), $N_{tnx}$ is a number of loaded, pending transactions for the particular process, $L_{tnx}$ is a load time of a particular transaction, $SLA_d$ is a dynamic SLA (e.g., measured in seconds), now is a time at which the calculation is performed (e.g., to be used across all process ranking calculations on a particular iteration of the evaluation), A is the current average time to complete a transaction (e.g., measured in seconds), and R is a number of robots currently running the process.

When all of the executing processes are ranked, the following example relationship can be used to determine how many resources to allocate to a particular process having a relatively low rank:

$$R^* = \left\lceil \frac{A * N_{tnx}}{\frac{\sum_{tnx=1}^{N_{tnx}}(L_{tnx} + SLA_d - now)}{N_{tnx}}} \right\rceil$$

To illustrate implementations of the present disclosure, a non-limiting example can be considered, and can include two processes (Process A. Process B) with four bots available for sharing. For Process A (a), the following parameters are provided:

$R_{input}a=1$;  $N_{tnx}a=5$;  $L_{tnx}a1=15:55$;  $L_{tnx}a2=15:55$;  $L_{tnx}a3=15:55$;  $L_{tnx}a4=15:55$;  $L_{tnx}a5=15:55$;  $SLA_d=120$; now=15:56; A=30; R=2

For Process B (b), the following parameters are provided:

$R_{input}b=2$;  $N_{tnx}b=3$;  $L_{tnx}b1=15:55$;  $L_{tnx}b2=15:55$;  $L_{tnx}b3=15:55$;  $SLA_d=120$; now=15:56; A=20; R=2

Based on the above example, the rankings can be calculated as:

$$P_{rank}a = \frac{1}{\frac{(15:55+120-15:56)*5}{5} - \left(\frac{30*5}{2}\right)} = -0.06$$

and $$P_{rank}b = \frac{2}{\frac{(15:55+120-15:56)*3}{3} - \left(\frac{20*3}{2}\right)} = 0.07$$

Because the rank values represent relative priority, the higher the rank value is on the positive side, the more close the process is to missing the deadline. However, when the rank is negative, the SLA will be breached (i.e., the deadline will be missed). In the example above, Process A has a higher priority. Accordingly, a number of resources to be assigned to Process A (R*a) can be determined as:

$$R^*a = \left\lceil \frac{30*5}{60} \right\rceil = 3$$

In this example, an extra resource (bot) is added to execute Process A to meet the SLA. Also in this example, Process B will still meet its SLA (e.g., with only one of the four bots assigned to it).

With regard to fixed SLAs, each process has to be completed by a certain fixed deadline measured from the time the process is loaded (e.g., within the RPA platform). For fixed SLAs, the SRM provides a metric of how long each process has until it reaches the deadline stated in the corresponding SLA configuration. The SRM proactively calculates the "closeness" to the deadline by extrapolating average completion time of completed transactions to the pending transactions. The SRM also weights the ranking based on how far back in time the transaction(s) of a process was loaded, giving a boost in the rank calculation. In accordance with implementations of the present disclosure, the SRM can rank, and determine resource allocation based on the following example relationships:

$$P_{rank} = \frac{R_{input}}{\left(SLA_f - now - \left(\frac{A*N_{tnx}}{R}\right)\right)} * \frac{\sum_{tnx=1}^{N_{tnx}}(now - L_{tnx})}{N_{tnx}}$$

and $$R^* = \left\lceil \frac{A*N_{tnx}}{SLA_f - now} \right\rceil$$

To illustrate implementations of the present disclosure, a non-limiting example can be considered, and can include two processes (Process A, Process B) with four bots available for sharing. For Process A, the following parameters are provided:

$R_{input}a=1$;  $N_{tnx}a=5$;  $L_{tnx}a1=15:55$;  $L_{tnx}a2=15:55$;  $L_{tnx}a3=15:55$; $L_{tnx}a4=15:55$; $L_{tnx}a5=15:55$; $SLA_f=16:00$; now=15:56; A=90; R=2

For Process B, the following parameters are provided:

$R_{input}b=2$;  $N_{tnx}b=3$;  $L_{tnx}b1=15:55$;  $L_{tnx}b2=15:55$; $L_{tnx}b3=15:55$; $SLA_f=16:30$; now=15:56; A=20; R=2

Based on the above example, the rankings can be calculated as:

$$P_{rank}a = \frac{1}{\left(16:00 - 15:56 - \left(\frac{90*5}{2}\right)\right)} * \frac{60*5}{5} = 4$$

and $$P_{rank}b = \frac{2}{\left(16:00 - 15:56 - \left(\frac{20*3}{2}\right)\right)} * \frac{60*3}{3} = 0.57$$

In this example, the higher rank signifies priority, as the closer to the deadline, the smaller the denominator would be, and the more priority is given. This means that Process A gets higher priority relative to Process B. Accordingly, a number of resources to be assigned to Process A (R*a) can be determined as:

$$R^*a = \left\lceil \frac{90*5}{240} \right\rceil = 1.88$$

In this example, since Process A is already being performed by two bots, Process A should meet its SLA.

In accordance with implementations of the present disclosure, the SRM automatically issues commands (through the respective adapters) to the RPA platform(s), whether dynamic of fixed. The commands are issued to inhibit missing of an SLA based on the rankings, as described herein. In some examples, resources are assigned until all available resources have been consumed, or, all processes have been mitigated to avoid missing a respective SLA. For example, and considering the dynamic SLA example above, a resource is added to Process A, such that three resources (bots) contribute to completing Process A in an effort to meet the SLA.

Figure 4:
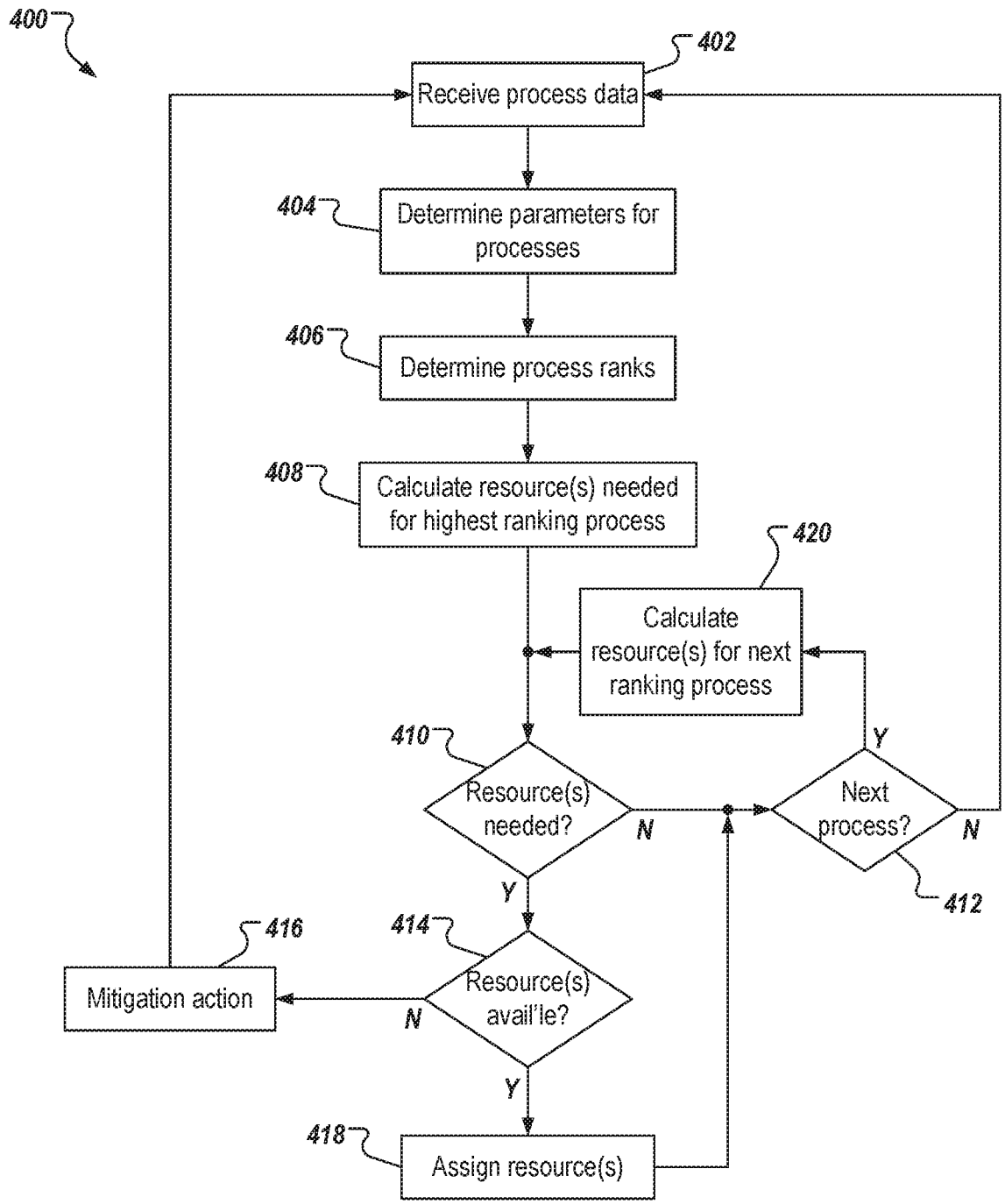
FIG. 4 depicts an example process in accordance with implementations of the present disclosure.

FIG. 4 depicts an example process 400 that can be executed in implementations of the present disclosure. In some examples, the example process 400 is provided using one or more computer-executable programs executed by one or more computing devices.

Process data and resource data are received (402). For example, and as described herein with reference to FIG. 2, process data representative of each process executing one on one or more RPA platforms 260 is provided to the AP 204 through respective platform adapters 220. Further, resource data representative of each resource (bot) provided on the respective RPA platforms 260 is provided through respective platform adapters 220 to the AP 204. Parameters are determined for each of the processes (404). For example, and as described herein, the following example parameters can be determined: a rank value indicating a relative priority of a process ($R_{input}$), a number of loaded, pending transactions for the particular process ($N_{tnx}$), a load time of a particular transaction ($L_{tnx}$), an SLA of the process (SLA), a time at which the calculation is performed (now), the current average time to complete a transaction (A), and a number of resources (bots) currently running the process (R).

Process ranks are determined for each of the processes (406). For example, and as described herein, for each process in a set of processes a process rank ($P_{rank}$) value is determined at least partially based on the parameters. A number of resources calculated for highest ranking resource (408). For example, and as described herein, the process having the highest positive process rank, or lowest negative process rank, is identified as the highest ranking process, for which a number of resources needed to meet the SLA (R*) is calculated. It is determined whether one or more resources are needed (410). For example, a number of resources (bots) currently running the process (R) is compared to the number of resources needed to meet the SLA (R*).

If no resources are needed, it is determined whether there is a next ranking process (412). For example, it is determined whether there is another process that might need additional resources to meet its SLA. If one or more resources are needed, it is determined whether sufficient resources are available (414). That is, for example, it is determined whether one or more bots are available to execute transactions of the process. In some examples, if one or more additional resources are needed, and no resources are available, it is determined that there are insufficient resources are available. In some examples, if two or more resources are needed, and there is less than the two or more resources available (e.g., three resources are needed, only two resources are available), it is determined that there are insufficient resources are available. If sufficient resources are not available, one or more mitigation actions are taken (416), and the example process 400 loops back. In some examples, a mitigation action can include providing an alert to the AP 204, which can be acted on in an effort to make more resources available (e.g., transitioning a bot from a process to the process that is at risk of missing the SLA). In some examples, mitigation actions can include issuing an alert, and provisioning any available resources to the process (e.g., although three resources are needed, provisioning the two available resources, while providing the alert to prompt action for additional resources).

If sufficient resources are available, the resources are assigned to execute the process (418), and the example process (400) loops back. That is, for example, the AP 204 issued instructions through a respective adapter 220 to have the resource(s) execute the process within the respective RPA platform 260. If there is no next ranking process (412), the example process 400 loops back. If there is a next ranking process (412), a number of resources is calculated for the next ranking resource (420), and the example process 400 continues as described above.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for managing resources executing in one or more robotic process automation (RPA) platforms, the method comprising:
   receiving, by one or more processors, process data representative of two or more processes executed by resources in a RPA platform, and resource data representative of the resources in the RPA platform;
   determining, by the one or more processors, a process rank for each of the two or more processes, respectively, each process rank being determined based on a plurality of parameters associated with a respective process, the plurality of parameters comprising two or more of a relative priority of the process, a number of loaded, pending transactions for the particular process, a load time of a particular transaction, an SLA of the process, a time at which the calculation is performed, a current average time to complete a transaction, and a number of resources currently running the process;
   for at least one process, calculating, by the one or more processors, a number of resources required to complete the process in conformance with a service level agreement (SLA) governing the process; and
   transmitting, by the one or more processors, instructions through a platform adapter to provision at least one additional resource to execute the process within the RPA platform, the platform adapter being specific to the RPA platform, and being one of a plurality of platform adapters.

2. The method of claim 1, further comprising determining that the at least one process is a highest ranking process based on a respective process rank, and in response, calculating the number of resources required.

3. The method of claim 1, further comprising:
   calculating, for a next ranking process, a number of resources required to complete the process in conformance with a SLA governing the next ranking process; and
   transmitting instructions through the platform adapter to provision at least one additional resource to execute the next ranking process within the RPA platform.

4. The method of claim 1, wherein a process rank for each of the two or more processes is iteratively determined during a period.

5. The method of claim 1, further comprising executing at least one mitigation action in response to determining that a number of available resources is less than a number of resources required to complete the process in conformance with the SLA.

6. The method of claim 1, wherein the instructions are transmitted by an autonomic platform (AP) of a unified automation platform (UAP) for RPA.

7. One or more non-transitory computer-readable storage media coupled to one or more processors and having instructions stored thereon which, when executed by the one or more processors, cause the one or more processors to perform operations for managing resources executing in one or more robotic process automation (RPA) platforms, the operations comprising:
   receiving process data representative of two or more processes executed by resources in a RPA platform, and resource data representative of the resources in the RPA platform;
   determining, by the one or more processors, a process rank for each of the two or more processes, respectively, each process rank being determined based on a plurality of parameters associated with a respective process, the plurality of parameters comprising two or more of a relative priority of the process, a number of loaded, pending transactions for the particular process, a load time of a particular transaction, an SLA of the process, a time at which the calculation is performed, a current average time to complete a transaction, and a number of resources currently running the process;

for at least one process, calculating a number of resources required to complete the process in conformance with a service level agreement (SLA) governing the process; and transmitting instructions through a platform adapter to provision at least one additional resource to execute the process within the RPA platform, the platform adapter being specific to the RPA platform, and being one of a plurality of platform adapters.

8. The computer-readable storage media of claim 7, wherein operations further comprise determining that the at least one process is a highest ranking process based on a respective process rank, and in response, calculating the number of resources required.

9. The computer-readable storage media of claim 7, wherein operations further comprise:

calculating, for a next ranking process, a number of resources required to complete the process in conformance with a SLA governing the next ranking process; and transmitting instructions through the platform adapter to provision at least one additional resource to execute the next ranking process within the RPA platform.

10. The computer-readable storage media of claim 7, wherein a process rank for each of the two or more processes is iteratively determined during a period.

11. The computer-readable storage media of claim 7, wherein operations further comprise executing at least one mitigation action in response to determining that a number of available resources is less than a number of resources required to complete the process in conformance with the SLA.

12. The computer-readable storage media of claim 7, wherein the instructions are transmitted by an autonomic platform (AP) of a unified automation platform (UAP) for RPA.

13. A system, comprising:

one or more processors; and a computer-readable storage device coupled to the one or more processors and having instructions stored thereon which, when executed by the one or more processors, cause the one or more processors to perform operations for managing resources executing in one or more robotic process automation (RPA) platforms, the operations comprising:

receiving process data representative of two or more processes executed by resources in a RPA platform, and resource data representative of the resources in the RPA platform;

determining, by the one or more processors, a process rank for each of the two or more processes, respectively, each process rank being determined based on a plurality of parameters associated with a respective process, the plurality of parameters comprising two or more of a relative priority of the process, a number of loaded, pending transactions for the particular process, a load time of a particular transaction, an SLA of the process, a time at which the calculation is performed, a current average time to complete a transaction, and a number of resources currently running the process;

for at least one process, calculating a number of resources required to complete the process in conformance with a service level agreement (SLA) governing the process; and transmitting instructions through a platform adapter to provision at least one additional resource to execute the process within the RPA platform, the platform adapter being specific to the RPA platform, and being one of a plurality of platform adapters.

14. The system of claim 13, wherein operations further comprise determining that the at least one process is a highest ranking process based on a respective process rank, and in response, calculating the number of resources required.

15. The system of claim 13, wherein operations further comprise:

calculating, for a next ranking process, a number of resources required to complete the process in conformance with a SLA governing the next ranking process; and transmitting instructions through the platform adapter to provision at least one additional resource to execute the next ranking process within the RPA platform.

16. The system of claim 13, wherein a process rank for each of the two or more processes is iteratively determined during a period.

17. The system of claim 13, wherein operations further comprise executing at least one mitigation action in response to determining that a number of available resources is less than a number of resources required to complete the process in conformance with the SLA.

* * * * *